United States Patent
Sheng

(10) Patent No.: US 10,686,954 B2
(45) Date of Patent: Jun. 16, 2020

(54) MULTI-PURPOSE PERIPHERAL HAVING TWO PIVOTAL COVERS

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/451,777

(22) Filed: Jun. 25, 2019

(65) Prior Publication Data

US 2020/0084328 A1 Mar. 12, 2020

(30) Foreign Application Priority Data

Sep. 7, 2018 (TW) ............... 107131451 A

(51) Int. Cl.
*H04N 1/00* (2006.01)

(52) U.S. Cl.
CPC ..... *H04N 1/00496* (2013.01); *H04N 1/00522* (2013.01); *H04N 1/00551* (2013.01); *H04N 1/00591* (2013.01); *H04N 1/00604* (2013.01)

(58) Field of Classification Search
CPC .......... H04N 1/00496; H04N 1/00522; H04N 1/00591; H04N 1/00551; H04N 1/00604
USPC ....................................... 358/1.13
See application file for complete search history.

(56) References Cited

U.S. PATENT DOCUMENTS

| | | | |
|---|---|---|---|
| 9,712,713 | B2 | 7/2017 | Sheng |
| 2008/0145121 | A1 | 6/2008 | Yoo |
| 2009/0236790 | A1 | 9/2009 | Lin |
| 2010/0052238 | A1 | 3/2010 | Lin |
| 2015/0304514 | A1 | 10/2015 | Sheng |
| 2016/0277624 | A1 | 9/2016 | Osanai et al. |
| 2017/0214811 | A1* | 7/2017 | Sakai ................. H04N 1/00559 |

FOREIGN PATENT DOCUMENTS

| | | |
|---|---|---|
| CN | 1746810 A | 3/2006 |
| CN | 2849779 Y | 12/2006 |
| CN | 101207683 A | 6/2008 |
| CN | 102281372 A | 12/2011 |
| CN | 105991884 A | 10/2016 |
| CN | 209209983 U | 8/2019 |
| KR | 20080064363 A | 7/2008 |
| TW | 485211 | 5/2002 |
| TW | 200420484 | 10/2004 |
| TW | 200831296 | 8/2008 |
| TW | 201540551 A | 11/2015 |

* cited by examiner

*Primary Examiner* — Saeid Ebrahimi Dehkordy
(74) *Attorney, Agent, or Firm* — Muncy, Geissler, Olds & Lowe, P.C.

(57) ABSTRACT

In a multi-purpose peripheral, a first cover pivotally disposed on a body has a lower surface and a platen portion opposite the lower surface; a second cover pivotally disposed on the body is separated from the first cover by a gap; a first scan assembly movably disposed in the body acquires an image of a first document covered, by the lower surface of the first cover, onto a transparent platen of the body; a transporting mechanism disposed in the body and the second cover transports a second document on the first cover; and a second scan assembly disposed in the second cover acquires an image of the second document transported by the transporting mechanism past the second scan assembly. Upper surfaces of the second cover and the first cover are disposed on the same horizontal surface.

21 Claims, 11 Drawing Sheets

MULTI-PURPOSE PERIPHERAL HAVING TWO PIVOTAL COVERS

CROSS-REFERENCE TO RELATED APPLICATIONS

This application claims priority of No. 107131451 filed in Taiwan R.O.C. on Sep. 7, 2018 under 35 USC 119, the entire content of which is hereby incorporated by reference.

BACKGROUND OF THE INVENTION

Field of the Invention

This disclosure relates to a multi-purpose peripheral, and more particularly to a multi-purpose peripheral having two pivotal covers and capable of providing a smooth supporting surface.

Description of the Related Art

FIG. 1 is a schematic view showing a conventional multi-purpose peripheral 200. As shown in FIG. 1, the conventional sheet-fed scanner or multi-purpose peripheral 200 includes a supply tray 210 for supporting an original O, and a discharge tray 220 for supporting the scanned original O. A path in which the original O is fed or transported is a U-shaped path 230. That is, the original O is fed from a pick-up roller 240 to a separation roller 250 and a friction pad 255, is transported by a feed roller 260 past scanning modules 270 and 275 and scanned thereby, and is finally outputted by an output roller 280 to the discharge tray 220. In addition, a scanning module 224 movable in a horizontal direction can scan a document disposed under the discharge tray 220 (not shown). The supply tray 210 is usually a most protruding portion of the whole sheet-fed scanner or multi-function peripheral (also referred to as a machine) and is susceptible to collision and damage, so the machine cannot be easily stored, and other articles, such as a notebook computer, a tablet computer, another scanner or multi-function peripheral, cannot be placed on the machine. In the office where the space is limited, placing the conventional sheet-fed scanner or multi-function peripheral encounters a rather inconvenient situation.

For example, when a user purchases the multi-function peripheral, he/she may not need to perform scan operations frequently but only needs to perform the print operations. Consequently, other articles cannot be placed on the multi-function peripheral, or multiple multi-function peripherals cannot be directly stacked. In this condition, the multi-function peripherals need to placed on a shelf, and the height of the shelf can't be too low because the covers of the multi-function peripherals need to be lifted up for perform the flatbed scanning operations. Consequently, a lot of space is wasted, and too much adjustable flexibility cannot be provided while providing firm supports for other articles. In addition, the multi-purpose peripheral 200 adopts a U-shaped transporting path, so the height cannot be reduced, and the thickness and hardness range of the original that can be transported and scanned are limited (because the original that is too thick or too hard cannot pass through the U-shaped transporting path). In addition, the user usually uses the right or left hand to place and remove the original, or needs to stand for a long time to operate the machine because the height of the machine is too high. So, the prior art machine does not satisfy the human engineering requirement and reduces the working efficiency.

BRIEF SUMMARY OF THE INVENTION

It is therefore an objective of this disclosure to provide a multi-purpose peripheral having two pivotal covers and capable of providing a smooth supporting surface distributed around a top of the multi-purpose peripheral so that another scanner or other articles can be firmly placed on the smooth supporting surface.

To achieve the above-identified object, this disclosure provides a multi-purpose peripheral including: a body; a first cover, which is pivotally disposed on the body, and has a lower surface and a platen portion opposite the lower surface; a second cover, which is pivotally disposed on the body, and separated from the first cover by a gap; a first scan assembly, which is movably disposed in the body, and moves in a direction toward or away from the second cover to acquire an image of a first document covered, by the lower surface of the first cover, onto a transparent platen of the body; a transporting mechanism, which is disposed in the body and the second cover, and transports a second document on the first cover; and a second scan assembly, which is disposed in the second cover, and acquires an image of the second document transported, by the transporting mechanism, past the second scan assembly, wherein a level of an output roller of the transporting mechanism for outputting the second document is lower than a level of the transparent platen.

This disclosure further provides a multi-purpose peripheral including: a body; a first cover, which is pivotally disposed on the body, and has a lower surface and a platen portion opposite the lower surface; a second cover, which is pivotally disposed on the body, and separated from the first cover by a gap; a first scan assembly, which is movably disposed in the body, and moves in a direction toward or away from the second cover to acquire an image of a first document covered, by the lower surface of the first cover, onto a transparent platen of the body; a transporting mechanism, which is disposed in the body and the second cover, and transports a second document on the first cover; and a second scan assembly, which is disposed in the second cover, and acquires an image of the second document transported, by the transporting mechanism, past the second scan assembly. An upper surface of the second cover and an upper surface of the platen portion of the first cover are disposed on the same horizontal surface, and the transporting mechanism transports the second document in a non-U-shaped transporting path.

This disclosure also provides a multi-purpose peripheral including: a body; a first cover, which is pivotally disposed on the body, and has a lower surface and a platen portion opposite the lower surface; a second cover, which is pivotally disposed on the body, and separated from the first cover by a gap; a first scan assembly, which is movably disposed in the body, and moves in a direction toward or away from the second cover to acquire an image of a first document covered, by the lower surface of the first cover, onto a transparent platen of the body; a transporting mechanism, which is disposed in the body and the second cover, and transports a second document on the first cover; and a second scan assembly, which is disposed in the second cover, and acquires an image of the second document transported, by the transporting mechanism, past the second scan assembly, wherein a horizontal surface intersecting the first scan assembly also intersects the second scan assembly.

Therefore, the essence of the embodiment of this disclosure is to provide a multi-purpose peripheral, and the level of the output roller of the transporting mechanism thereof is lower (e.g., is lower than the transparent platen). In addition to the provision of sheet-fed and flatbed scanning functions, the multi-purpose peripheral also has the circumferential flat upper surface to firmly support other articles or the scanner with the same size as the multi-purpose peripheral. In addition, the user can easily place other articles on the multi-purpose peripheral without too complicated retraction so that other electronic apparatuses can be firmly placed thereon, the relatively high resilience in use can be obtained, a neat appearance can be obtained, and the supply tray cannot be easily susceptible to collision and damage.

Furthermore, a concave portion for sheet feeding is formed on the first cover above the platen portion, the data document is transported into the second scan assembly for image acquiring, and a sheet outlet is disposed on the lateral side of the body. Thus, the first cover of the multi-purpose peripheral shortens the reversed sheet output path, so that the whole volume of the multi-purpose peripheral becomes small, and a sheet feeding portion cannot be easily damaged due to the excess mechanisms.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
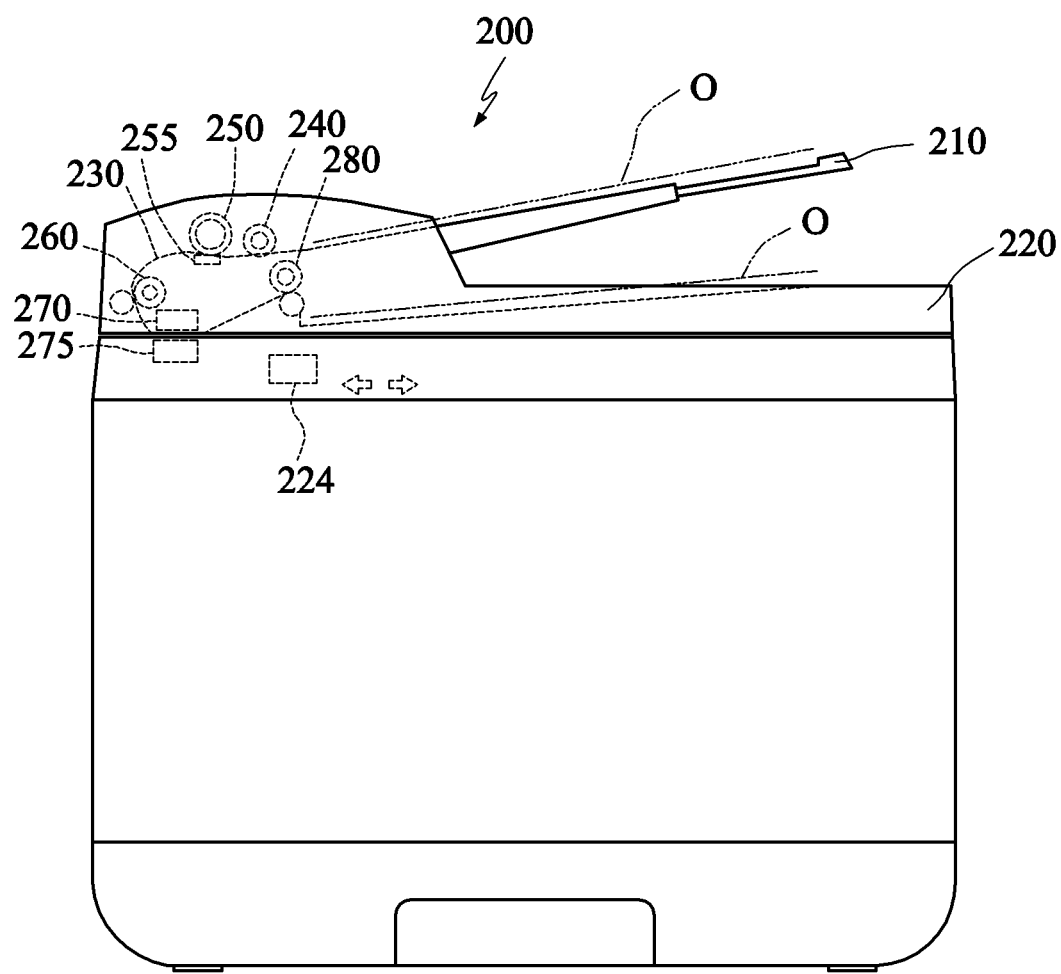
FIG. 1 is a schematic view showing a conventional multi-purpose peripheral.

FIGS. 2 to 5 are respectively a schematic front view of a closed state, a schematic front view of an opened state, a pictorial view of the closed state and a schematic top view of the closed state of a multi-purpose peripheral according to a first embodiment of this disclosure. As shown in FIGS. 2 to 5, this embodiment provides a multi-purpose peripheral 1, which includes a body 10, a first cover 20, a second cover 30, a first scan assembly 40, a transporting mechanism 50 and a second scan assembly 60.

The body 10 in this embodiment provides functions of a flatbed scanner and a printer. Therefore, the multi-purpose peripheral 1 may further include a printer 90 disposed on the body 10. The printer 90 has: a print media tray 140 for storing media to be printed; and a print medium discharge tray 150 for storing printed media.

The first cover 20 is pivotally disposed on the body 10, and has a lower surface 21 and a platen portion 22 and a concave portion 24 both opposite the lower surface 21 (the concave portion 24 may be omitted according to requirements). Therefore, the first cover 20 is pivotally connected to the body 10 through two hinges 110, and may provide functions of covering a flatbed scan document and supporting a transported scan document, so that the scanner may be called as the multi-purpose peripheral.

The second cover 30 is pivotally disposed on the body 10, and separated from the first cover 20 by a gap G. The second cover 30 provides document transporting and document-fed scanning functions. In addition, top portions of the first cover 20 and the second cover 30 provide a circumferential flat upper surface for supporting other articles, which may more particularly include another multi-purpose peripheral, a notebook computer, a printer and the like.

The first scan assembly 40 is movably disposed in the body 10, and moves in a direction toward or away from the second cover 30 to acquire an image of a first document D1 covered, by the lower surface 21 of the first cover 20, onto a transparent platen 11 of the body 10.

The transporting mechanism 50 is disposed in the body 10 and the second cover 30, and transports a second document D2 partially located on the first cover 20. In this embodiment, the second document D2 is partially located on the concave portion 24 of the first cover 20, and the transporting mechanism 50 transports second document D2 in a non-U-shaped transporting path.

The second scan assembly 60 is disposed in the second cover 30, and acquires an image of the second document D2 transported by the transporting mechanism 50 past the second scan assembly 60, wherein an upper surface 32 of the second cover 30 and an upper surface 23 of the platen portion 22 of the first cover 20 are disposed on the same horizontal surface or plane, so that they may provide the circumferential flat upper surface to support other articles.

In this embodiment, a scan window 61 of the second scan assembly 60 for scanning the second document D2 is disposed below an extension surface ES of the transparent platen 11, so that it is beneficial to design the second cover 30 and the first cover 20 for providing the circumferential flat upper surface. More particularly, the second scan assembly 60 for scanning the second document D2 is entirely disposed below the extension surface ES of the transparent platen 11.

The multi-purpose peripheral 1 may further include a transporting passage 100, a discharge tray 80, a third scan assembly 70, an operation panel 120 and a width adjuster 130.

The transporting mechanism 50 transports the second document D2 through the second scan assembly 60 along the transporting passage 100. The discharge tray 80 is pivotally disposed on one side surface 12 of the body 10, and supports the second document D2, which has been scanned by the second scan assembly 60. The discharge tray 80 in this embodiment has the advantage of the small volume, and can be easily retracted to the side surface 12 of the body 10. The discharge tray 80 is extended upward from the bottom of the discharge tray 80 serving as a fulcrum for pivotal rotation to provide a storage space with an opening facing up. In addition, when the discharge tray 80 is opened, an angle between the discharge tray 80 and the horizontal surface is smaller than 60 degrees or 45 degrees. On the other hand, because the document is stopped at the bottom of the discharge tray 80, there is no need to provide a stopper plate or a stopper structure additionally, therefore achieving the effect of saving or simplifying components.

The third scan assembly 70 is disposed in the body 10 and opposite the second scan assembly 60. The second scan assembly 60 and the third scan assembly 70 cooperate to scan images on two sides of the second document D2. In this embodiment, the first scan assembly 40 can move in a direction toward or away from the third scan assembly 70 to acquire the image of the first document D1. The operation panel 120 is disposed on the body 10, so that the user can set and perform the operation through the operation panel 120. The width adjuster 130 is movably disposed in the concave portion 24, so that the user can adjust the width adjuster 130 to fit with the width of the second document to be scanned. For example, in FIG. 5, the width adjuster 130 can be adjusted to move up and down, and the upper surface 23 of the platen portion 22 has a U-shape in the top view (see FIG. 5), and may provide a circumferential flat surface similar to an annular rectangular frame working in conjunction with the upper surface 32 of the second cover 30 to provide the supporting effect. In the top view (see FIG. 5), a ratio of a top-view depressed area of the concave portion 24 to a total top-view area of both the first cover 20 and the second cover 30 is smaller than 50%. That is, the top-view depressed area of the concave portion 24 is smaller than the total top-view area of the planes of both the first cover 20 and the second cover 30. In another example, a ratio of the top-view depressed area of the concave portion 24 to a top view area of the first cover 20 is smaller than 50%. Therefore, the first cover 20 and the second cover 30 can provide a quite large plane area for supporting other electronic apparatuses.

In another example, the second cover 30 may also be considered as including a first portion 31, a second portion 32 and a third portion 33. The first portion 31 can be provided with a driving mechanism (including a gearset and a motor) 51 for driving a pick-up roller 52 to perform the pick-up operation. The second portion 32 is provided with the second scan assembly 60 below which the third scan assembly 70 is disposed. The first portion 31 and the third portion 33 provide the basis for pivoting and snapping with the second portion 32, and also auxiliary provide a circumferential flat surface at the same time.

In addition, an inclined surface 25 of the concave portion 24 is connected to the upper surface 23 of the platen portion 22, and the inclined surface 25 and the upper surface 23 of the platen portion 22 commonly support different portions of the second document D2.

Figure 6:
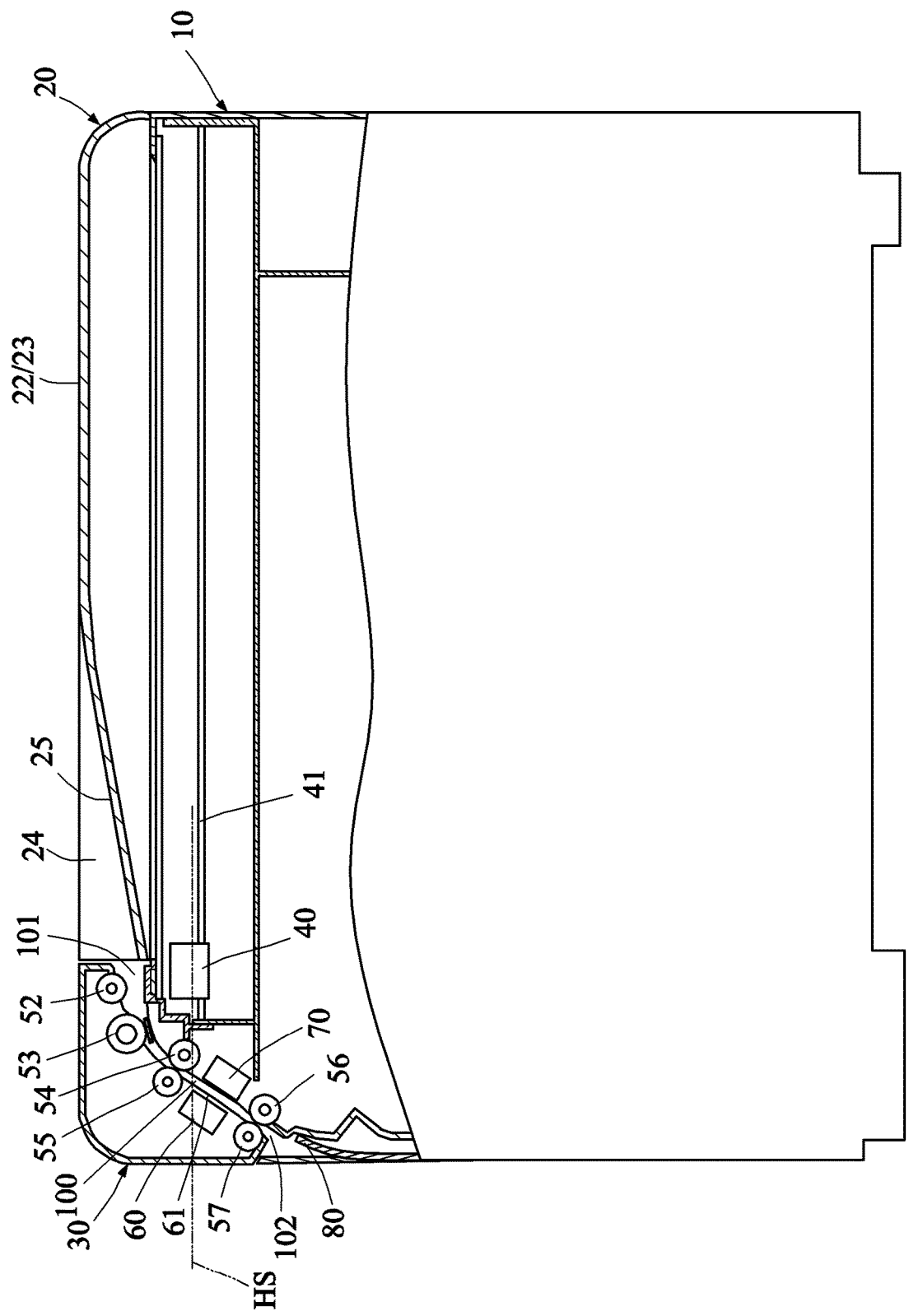
FIG. 6 is a partially schematically cross-sectional view showing a closed state of a multi-purpose peripheral according to a second embodiment of this disclosure.
Figure 7:
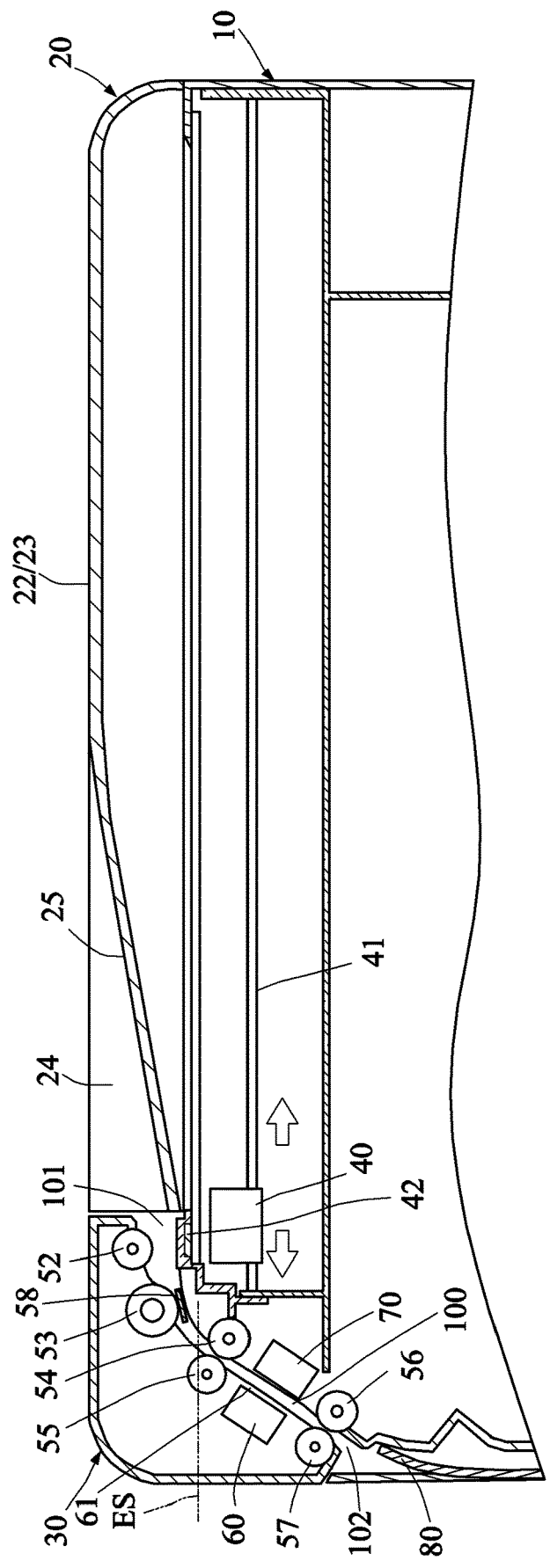
FIG. 7 is a partially enlarged schematically cross-sectional view of FIG. 6.

FIG. 6 is a partially schematically cross-sectional view showing the closed state of the multi-purpose peripheral according to the second embodiment of this disclosure. FIG. 7 is a partially enlarged schematically cross-sectional view of FIG. 6. This embodiment is similar to the first embodiment. For example, the first scan assembly 40 can move along a guiding rod 41, and other similar portions can be found in FIGS. 2 to 5 except for the difference that the transporting passage 100 is much more inclined, which is advantageous to the reduction of the volumes of the second cover 30 and the whole multi-purpose peripheral 1. As shown in FIGS. 6 and 7, the transporting mechanism 50 (see also FIG. 2) includes the driving mechanism 51 (see FIG. 5), the pick-up roller 52, a friction roller 53, rollers 54 to 57 and a friction pad 58 to achieve the sheet feeding and separating functions, wherein the rollers 56 and 57 are also named as output rollers for outputting the second document D2 to the discharge tray 80.

Figure 2:
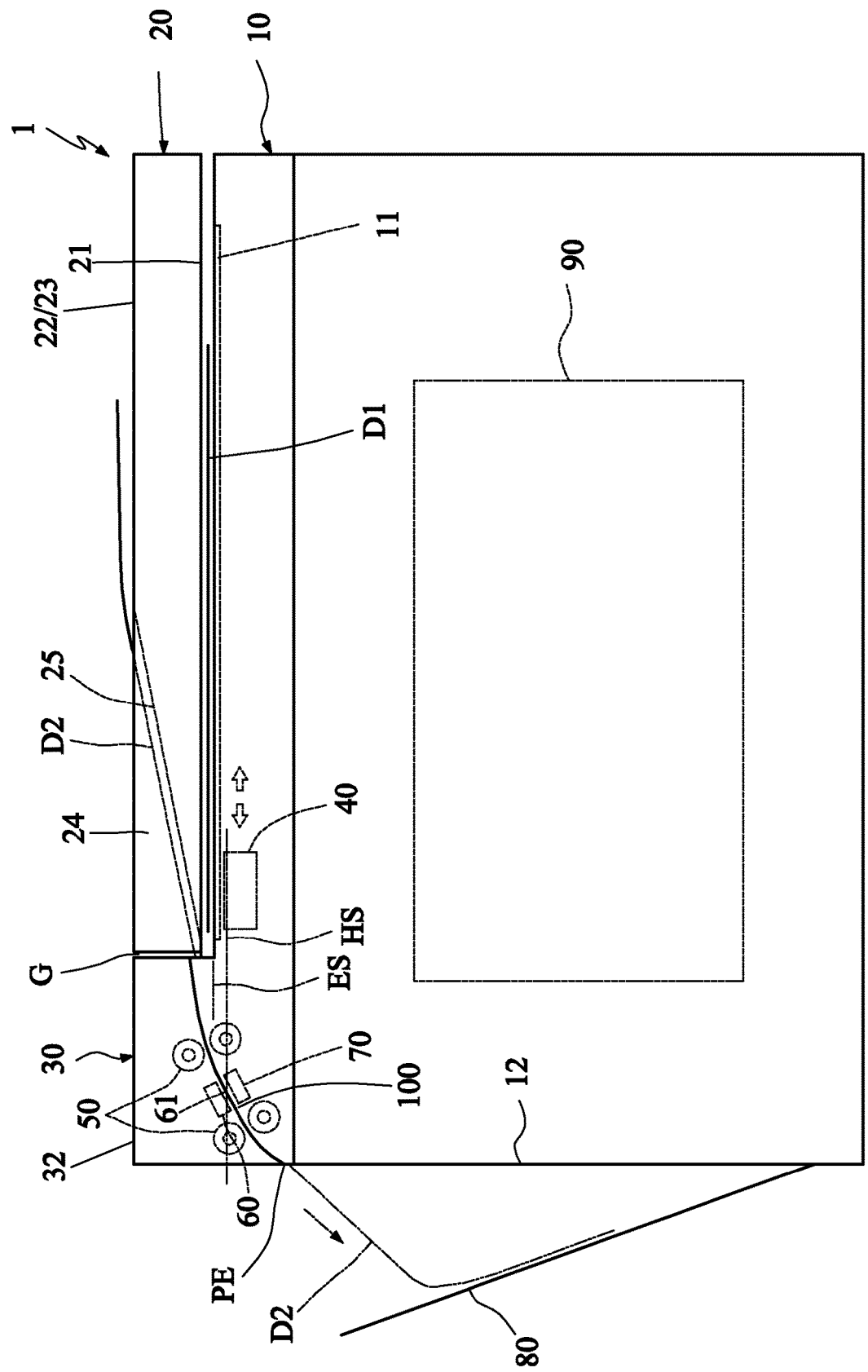
FIG. 2 is a schematic front view showing a closed state of a multi-purpose peripheral according to a first embodiment of this disclosure.
Figure 3:
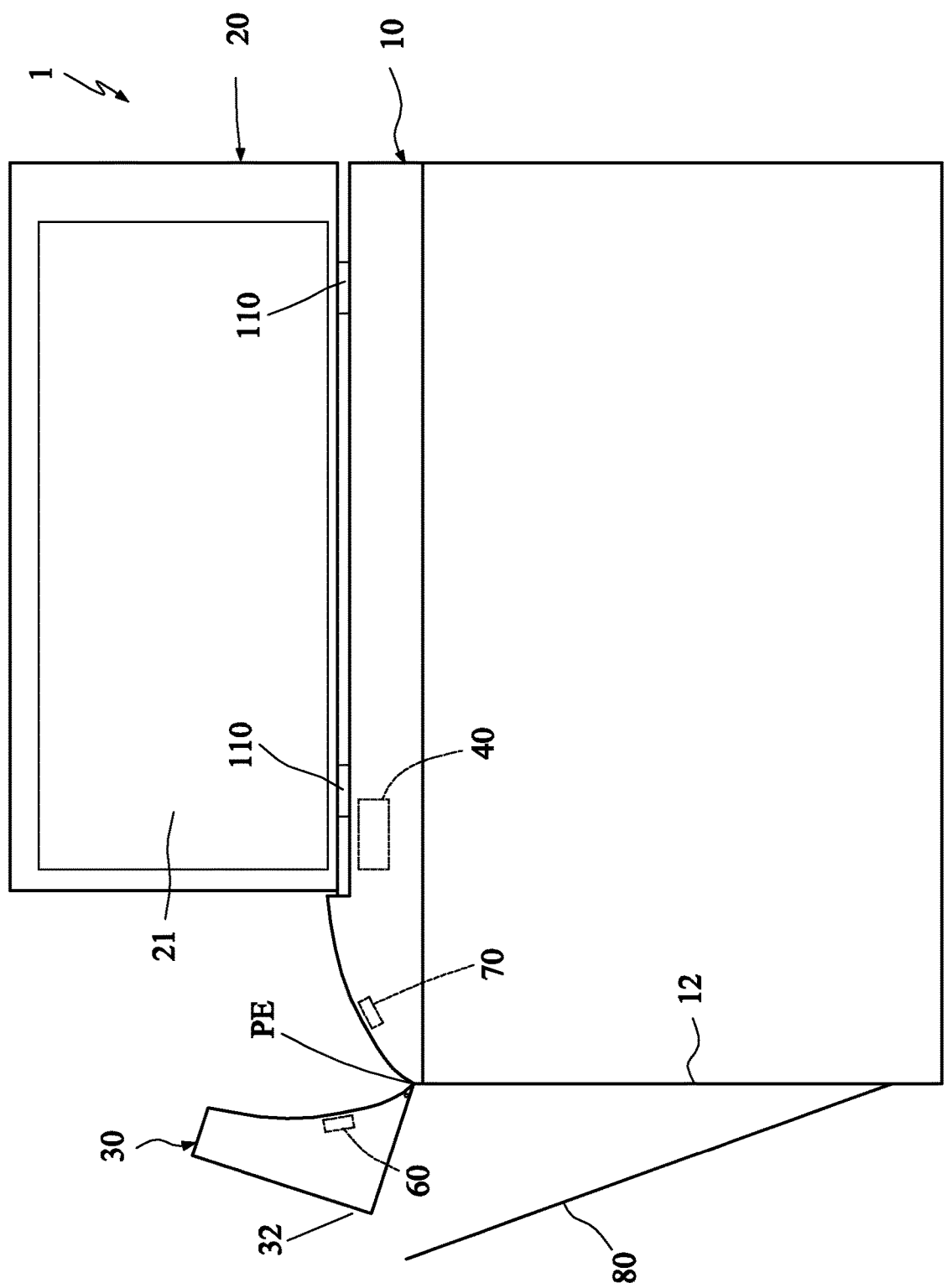
FIG. 3 is a schematic front view showing an opened state of the multi-purpose peripheral according to the first embodiment of this disclosure.
Figure 4:
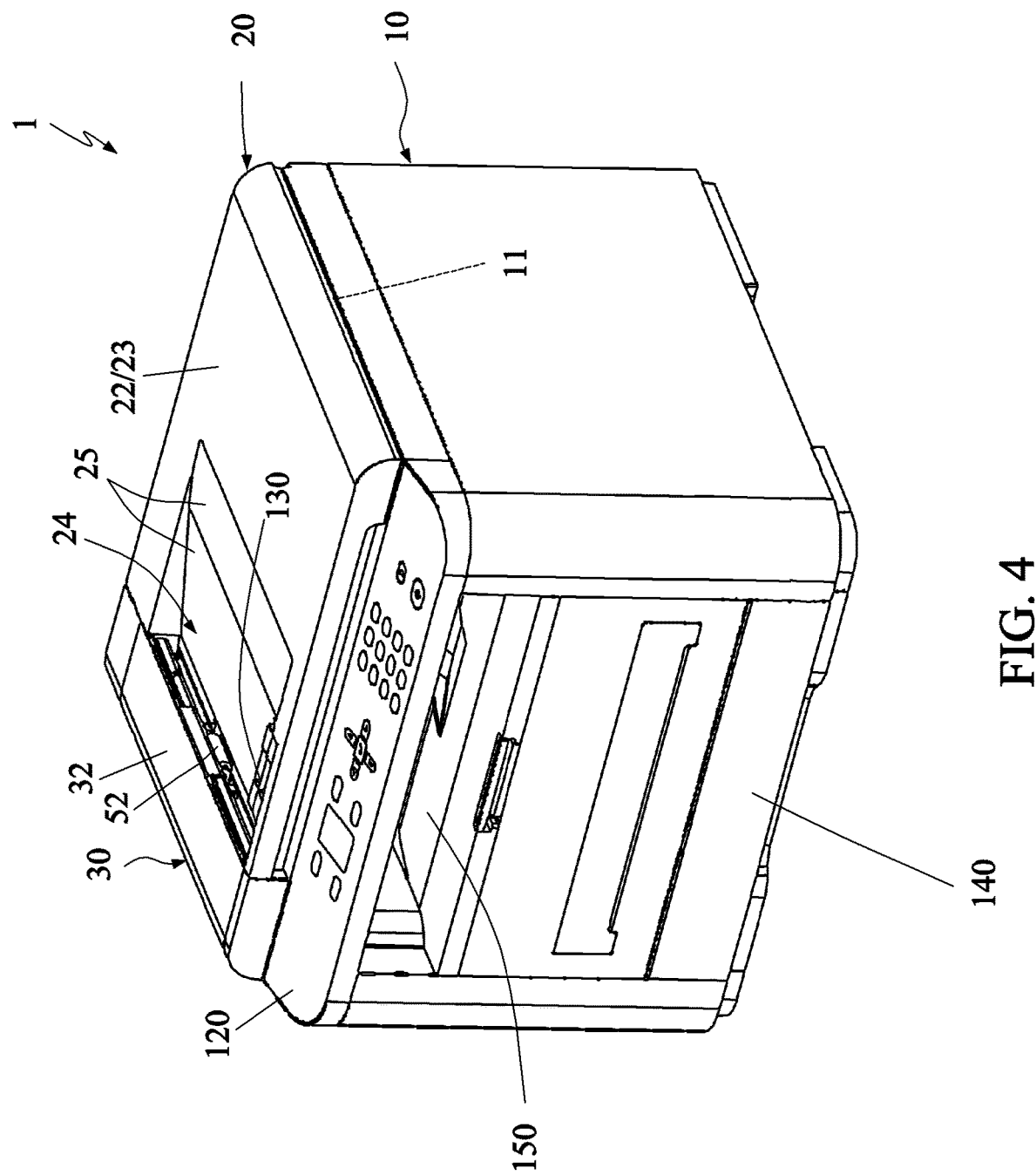
FIG. 4 is a pictorial view showing the closed state of the multi-purpose peripheral according to the first embodiment of this disclosure.
Figure 5:
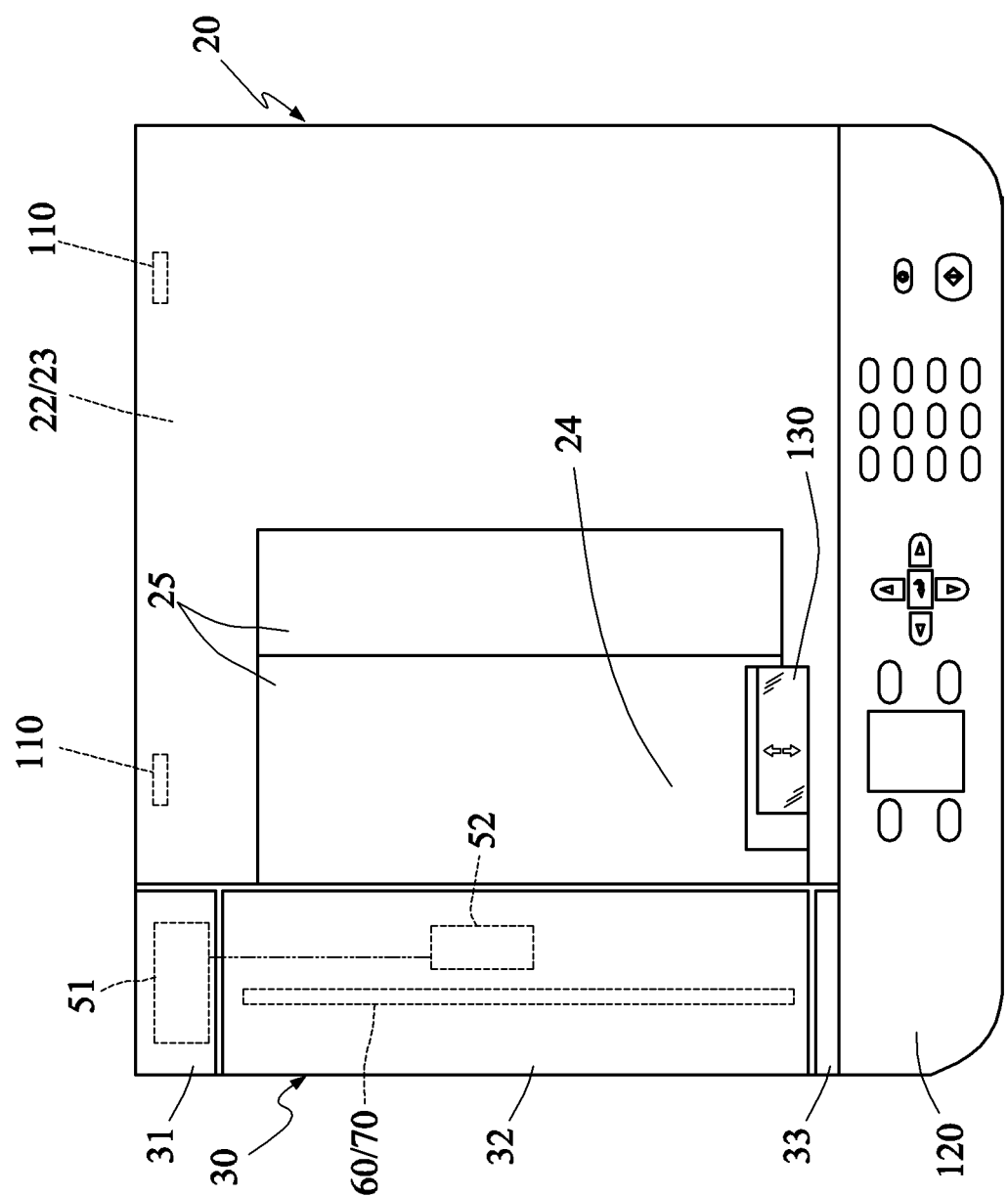
FIG. 5 is a schematic top view showing the closed state of the multi-purpose peripheral according to the first embodiment of this disclosure.

In order to achieve the configurations of FIGS. 6 and 7, a level (or height) of an outlet 102 of the transporting passage 100 is lower than a level of an inlet 101 of the transporting passage 100, and is lower than a level of the transparent platen 11. More particularly, the level of the outlet 102 of the transporting passage 100 is lower than a level of the first scan assembly 40. As shown in FIG. 7, a level of the output roller 56 or 57 is lower than a level of the transparent platen 11, or is lower than a level of the first scan assembly 40, or is lower than a level of the second scan assembly 60, or is higher than a highest level of the discharge tray 80. As shown in FIGS. 2 and 3, a level of a pivot PE between the second cover 30, accommodating the second scan assembly 60, and the body 10 is lower than the level of the transparent platen 11. In this embodiment, the level of the output roller 56 or 57 includes, but is not limited to, the highest level, the lowest level, the average level, or the level of the nip between the output rollers 56 and 57. In addition, a horizontal surface HS intersecting the first scan assembly 40 also intersects the second scan assembly 60. That is, there is a horizontal surface HS that can pass through the first scan assembly 40 and the second scan assembly 60; or the first scan assembly 40 for performing an upward scan and the second scan assembly 60 for performing a downward scan are substantially disposed at the same level. The level of the second scan assembly 60 is higher than that of the third scan assembly 70. The horizontal surface HS may be defined by the movement plane of the first scan assembly 40, or may be defined by the transparent platen 11 or an upper surface of the platen portion 22.

In addition, the multi-purpose peripheral further includes a calibration sheet 42, wherein the first scan assembly 40 scans the calibration sheet 42 to perform brightness calibration, and the calibration sheet 42 is disposed under the pick-up roller 52 of the transporting mechanism 50, so that more configuration space is saved, and the pick-up roller 52 picks up the second document D2 to enter the transporting passage 100 of the multi-purpose peripheral 1.

Figure 8:
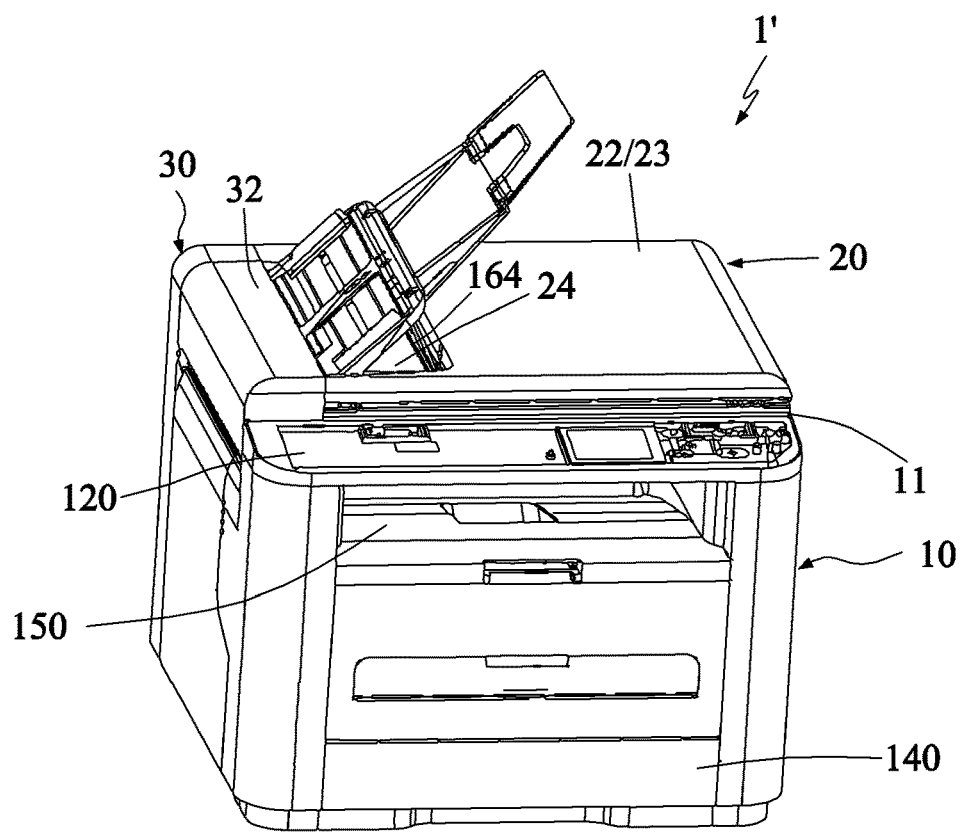
FIGS. 8 and 9 are respectively a pictorial view and a partial pictorial view showing a first state and a second state of a multi-purpose peripheral according to a third embodiment of this disclosure.
Figure 9:
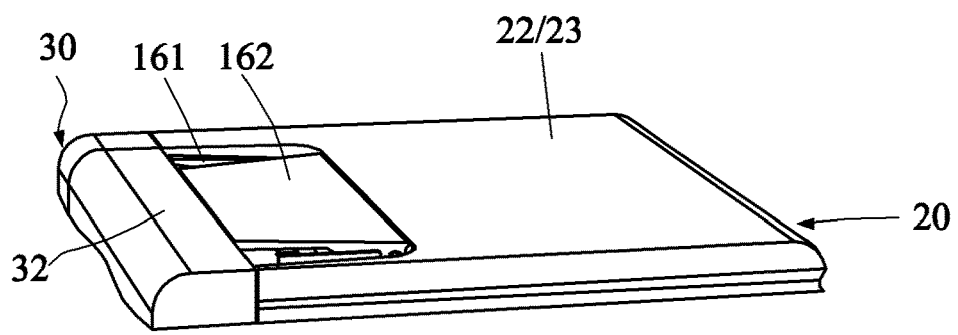
Figure 10:
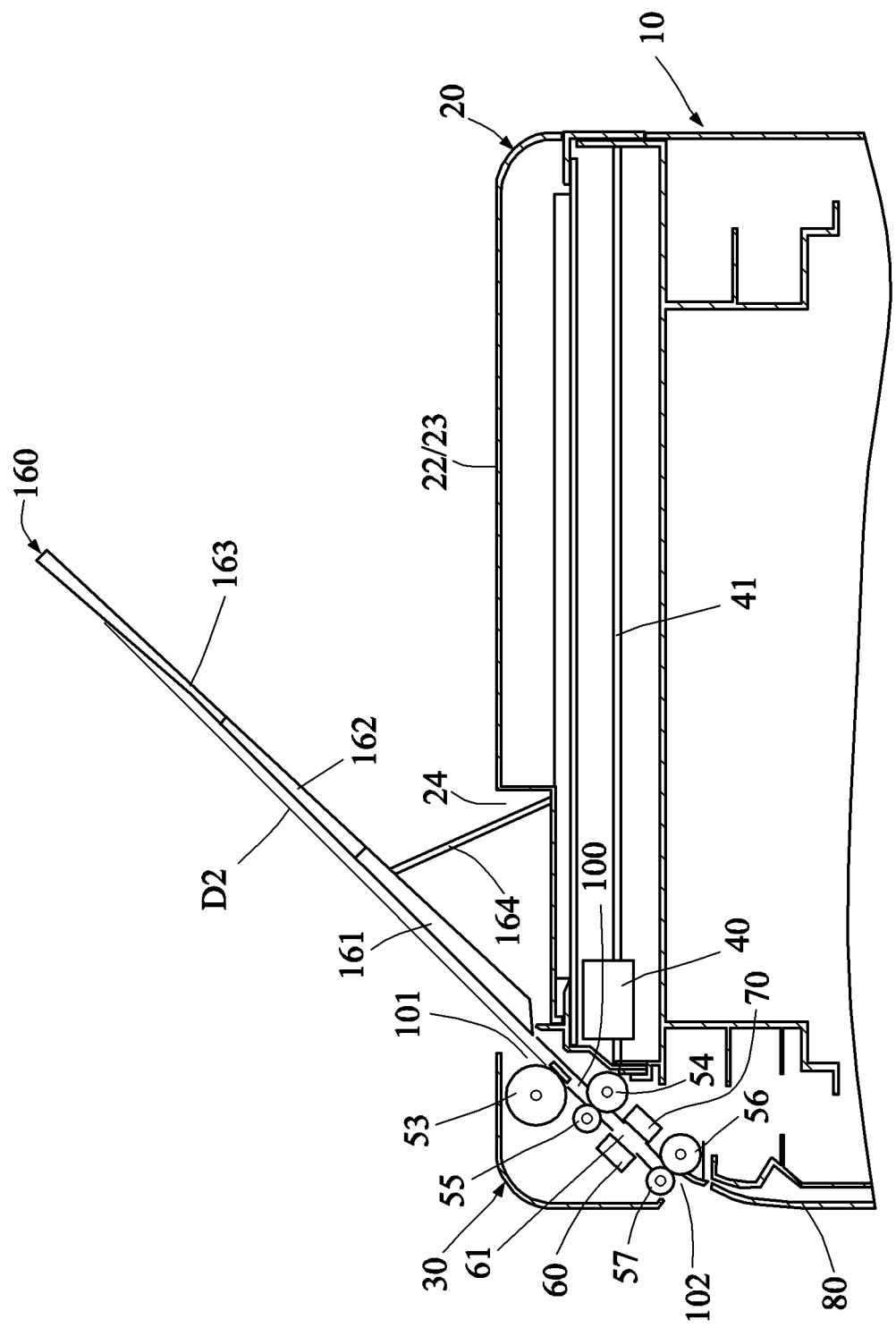
FIG. 10 is a partially schematically cross-sectional view showing the first state of the multi-purpose peripheral in FIG. 8.

FIGS. 8 and 9 are respectively a pictorial view and a partial pictorial view showing a first state and a second state of a multi-purpose peripheral 1' according to a third embodiment of this disclosure. FIG. 10 is a partially schematically cross-sectional view showing the first state of the multi-purpose peripheral 1' in FIG. 8. As shown in FIGS. 8 to 10, this embodiment is similar to the first embodiment except for the difference that the multi-purpose peripheral 1' further includes a document supply tray 160, which is disposed in the concave portion 24, and supports the second document D2. The document supply tray 160 is rotatably disposed on the concave portion 24. When the document supply tray 160 is rotated to a first state (see FIGS. 8 and 10), the document supply tray 160 supports the second document D2 to make the second document D2 enter the transporting passage 100. When the document supply tray 160 is rotated to a second state (FIG. 9), the document supply tray 160 is entirely accommodated within the concave portion 24. More particularly, a portion of the document supply tray 160 is flush with the platen portion 22 to provide the larger platen supporting area in addition to the annular rectangular frame. Because this embodiment uses the gravity to achieve the sheet feeding function, no pick-up roller is provided.

In this embodiment, the document supply tray 160 includes: a first tray 161 pivotally mounted on the first cover 20; a second tray 162 pivotally mounted on the first tray 161; a third tray 163 pivotally mounted on the second tray 162; and a support plate 164, which is pivotally mounted on the first tray 161 and supports the first tray 161 relatively to the first cover 20 in the first state. It is worth noting that, in another example, the second tray 162 is movably mounted on the first tray 161, and can be retracted into or extend out of the first tray 161, and the third tray 163 can be omitted. In FIG. 9, the second tray 162 of the document supply tray 160 is flush with the platen portion 22.

Figure 11:
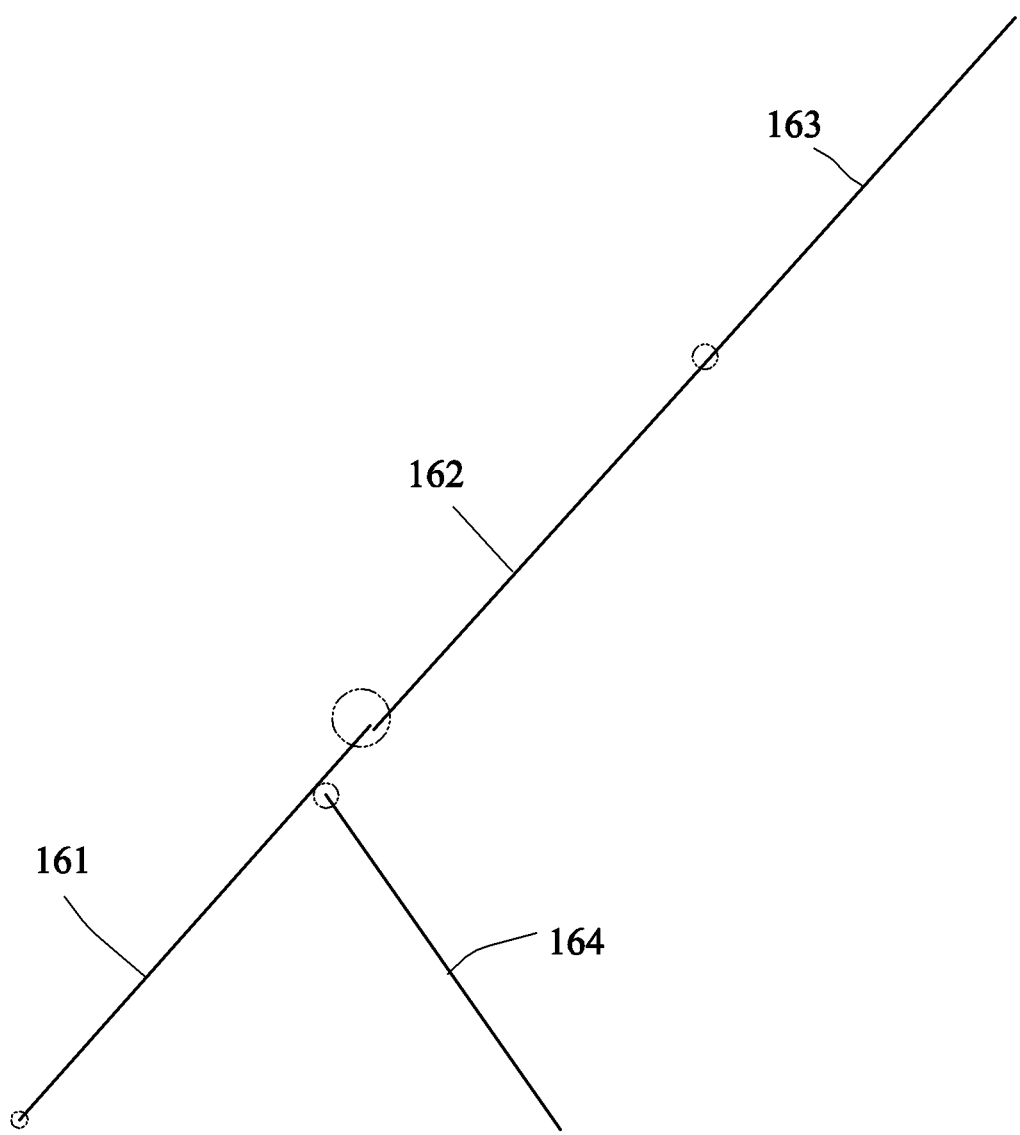
FIGS. 11 to 14 are schematic views showing retracting steps of a document supply tray of the multi-purpose peripheral in FIG. 8.
Figure 12:
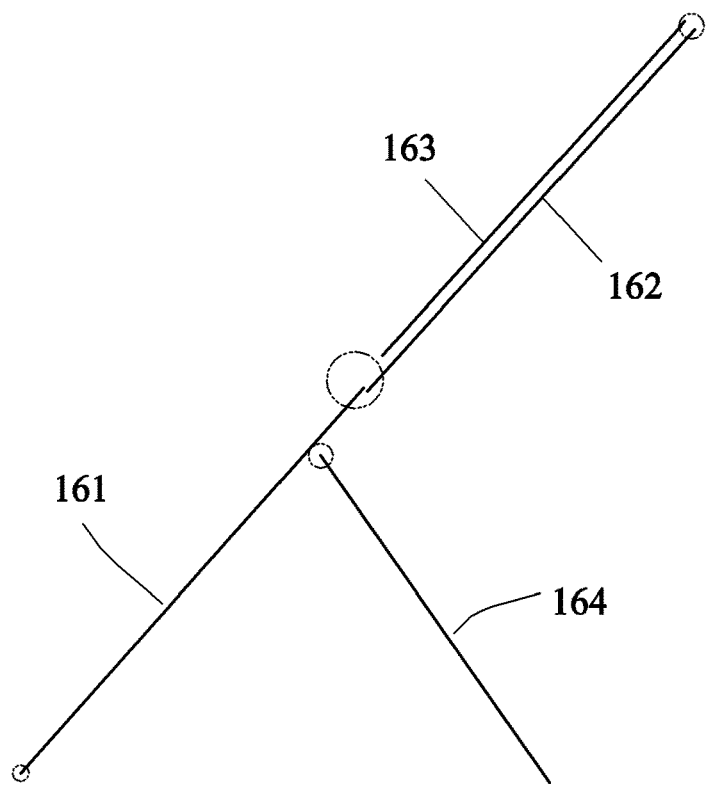
Figure 13:
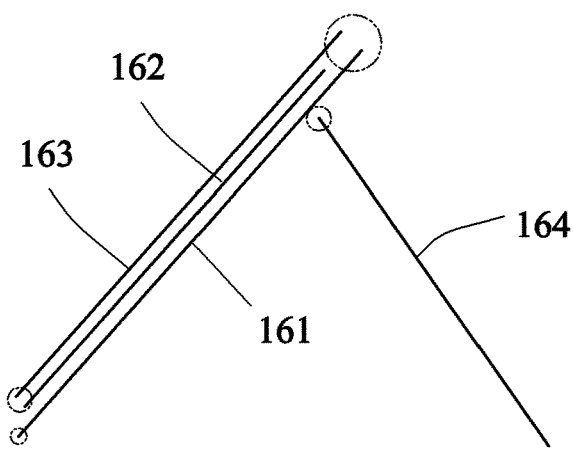
Figure 14:
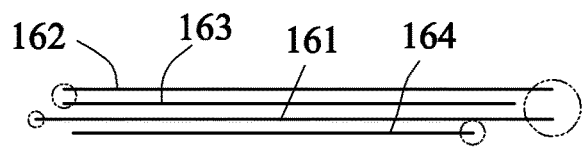

FIGS. 11 to 14 are schematic views showing retracting steps of the document supply tray 160 of the multi-purpose peripheral in FIG. 8. FIG. 11 shows the state in which the document supply tray 160 is fully deployed, wherein the circle of the phantom line represents the pivotal connection. As shown in FIG. 12, the user folds the third tray 163 toward the second tray 162. As shown in FIG. 13, the user folds the third tray 163 and the second tray 162 toward the first tray 161. As shown in FIG. 14, the user folds the support plate 164 toward the first tray 161, and then retracts the overall combination of the first tray 161 to the support plate 164 to make the support plate 164 be in flat surface contact with the concave portion 24 (see FIG. 10), so the overall retracting processes are quite simple.

The multi-purpose peripheral 1 uses a non-U-shaped transporting path, so it does not need the space for the U-shape reversion, its height can be effectively reduced, the thickness and hardness range of the original that can be transported and scanned are increased, and the user can use the right hand to place the original, and the left hand to take out the original. The user may also sit down to easily operate the multi-purpose peripheral placed on the desk, so the human engineering is satisfied, and the working efficiency can be increased.

Therefore, the essence of the embodiment of this disclosure is to provide a multi-purpose peripheral, and the level of the output roller of the transporting mechanism thereof is lower (e.g., is lower than the transparent platen). In addition to the provision of sheet-fed and flatbed scanning functions, the multi-purpose peripheral also has the circumferential flat upper surface to firmly support other articles or the scanner with the same size as the multi-purpose peripheral. In addition, the user can easily place other articles on the multi-purpose peripheral without too complicated retraction so that other electronic apparatuses can be firmly placed thereon, the relatively high resilience in use can be obtained, a neat appearance can be obtained, and the supply tray cannot be easily susceptible to collision and damage. In addition, because this disclosure does not use the U-shaped transporting passage, the document supply tray and the first cover can be integrated together, and the volume of the whole peripheral can be reduced.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A multi-purpose peripheral, comprising:
   a body;
   a first cover, which is pivotally disposed on the body and has a lower surface and a platen portion opposite the lower surface;
   a second cover, which is pivotally disposed on the body and separated from the first cover by a gap;
   a first scan assembly, which is movably disposed in the body, and moves in a direction toward or away from the second cover to acquire an image of a first document covered, by the lower surface of the first cover, onto a transparent platen of the body;
   a transporting mechanism, which is disposed in the body and the second cover and transports a second document on the first cover; and
   a second scan assembly, which is disposed in the second cover and acquires an image of the second document transported by the transporting mechanism past the second scan assembly, wherein:
   a level of an output roller of the transporting mechanism for outputting the second document is lower than a level of the transparent platen.

2. The multi-purpose peripheral according to claim 1, wherein the level of the output roller is lower than a level of the first scan assembly or a level of the second scan assembly.

3. The multi-purpose peripheral according to claim 1, further comprising a discharge tray, which is pivotally disposed on one side surface of the body, and supports the second document, which has been scanned by the second scan assembly, wherein the level of the output roller is higher than a highest level of the discharge tray.

4. The multi-purpose peripheral according to claim 1, wherein a level of a pivot between the second cover, accommodating the second scan assembly, and the body is lower than the level of the transparent platen.

5. A multi-purpose peripheral, comprising:
   a body;
   a first cover, which is pivotally disposed on the body and has a lower surface and a platen portion opposite the lower surface;
   a second cover, which is pivotally disposed on the body and separated from the first cover by a gap;
   a first scan assembly, which is movably disposed in the body, and moves in a direction toward or away from the second cover to acquire an image of a first document covered, by the lower surface of the first cover, onto a transparent platen of the body;
   a transporting mechanism, which is disposed in the body and the second cover and transports a second document on the first cover; and
   a second scan assembly, which is disposed in the second cover and acquires an image of the second document transported by the transporting mechanism past the second scan assembly, wherein an upper surface of the second cover and an upper surface of the platen portion of the first cover are disposed on the same horizontal surface, wherein the transporting mechanism transports the second document in a non-U-shaped transporting path.

6. The multi-purpose peripheral according to claim 5, wherein a scan window of the second scan assembly for scanning the second document is disposed below an extension surface of the transparent platen.

7. The multi-purpose peripheral according to claim 5, wherein the second scan assembly for scanning the second document is entirely disposed below an extension surface of the transparent platen.

8. The multi-purpose peripheral according to claim 5, further comprising a transporting passage, wherein the transporting mechanism transports the second document through the second scan assembly along the transporting passage, and a level of an outlet of the transporting passage is lower than a level of an inlet of the transporting passage and is lower than a level of the transparent platen.

9. The multi-purpose peripheral according to claim 8, wherein the level of the outlet of the transporting passage is lower than a level of the first scan assembly.

10. The multi-purpose peripheral according to claim 5, further comprising a discharge tray, which is pivotally disposed on one side surface of the body, and supports the second document, which has been scanned by the second scan assembly.

11. The multi-purpose peripheral according to claim 5, wherein the first cover further has a concave portion disposed opposite the lower surface, an inclined surface of the concave portion is connected to the upper surface of the platen portion, and the inclined surface and the upper surface of the platen portion commonly support different portions of the second document.

12. The multi-purpose peripheral according to claim 5, further comprising a third scan assembly, which is disposed in the body and opposite the second scan assembly, wherein the second scan assembly and the third scan assembly commonly scan images on two sides of the second document, wherein the first scan assembly can move in a direction toward or away from the third scan assembly to acquire the image of the first document.

13. The multi-purpose peripheral according to claim 5, further comprising a width adjuster, wherein the first cover further has a concave portion disposed opposite the lower surface, and the width adjuster is movably disposed in the concave portion.

14. The multi-purpose peripheral according to claim 5, wherein the first cover further has a concave portion disposed opposite the lower surface, and the upper surface of the platen portion has a U-shape, wherein in a top view, a ratio of a top-view depressed area of the concave portion to a total top-view area of both of the first cover and the second cover is smaller than 50%.

15. The multi-purpose peripheral according to claim 5, further comprising a calibration sheet, wherein the first scan assembly scans the calibration sheet to perform brightness calibration, the calibration sheet is disposed under a pick-up roller of the transporting mechanism, and the pick-up roller picks up the second document to enter a transporting passage of the multi-purpose peripheral.

16. The multi-purpose peripheral according to claim 5, further comprising a document supply tray, wherein the first cover further has a concave portion disposed opposite the lower surface, and the document supply tray is disposed in the concave portion and supports the second document.

17. The multi-purpose peripheral according to claim 16, wherein the document supply tray is rotatably disposed in the concave portion, wherein: when the document supply tray is rotated to a first state, the document supply tray supports the second document to make the second document enter a transporting passage of the multi-purpose peripheral; and when the document supply tray is rotated to a second state, the document supply tray is entirely accommodated within the concave portion, and a portion of the document supply tray is flush with the platen portion.

18. The multi-purpose peripheral according to claim 17, wherein the document supply tray comprises:
a first tray pivotally mounted on the first cover;
a second tray pivotally or movably mounted on the first tray; and
a support plate, which is pivotally mounted on the first tray and supports the first tray relatively to the first cover in the first state.

19. The multi-purpose peripheral according to claim 5, wherein the first cover further has a concave portion disposed opposite the lower surface, and the transporting mechanism transports the second document partially disposed in the concave portion of the first cover.

20. A multi-purpose peripheral, comprising:
a body;
a first cover, which is pivotally disposed on the body and has a lower surface and a platen portion opposite the lower surface;
a second cover, which is pivotally disposed on the body and separated from the first cover by a gap;
a first scan assembly, which is movably disposed in the body, and moves in a direction toward or away from the second cover to acquire an image of a first document covered, by the lower surface of the first cover, onto a transparent platen of the body;
a transporting mechanism, which is disposed in the body and the second cover and transports a second document on the first cover; and
a second scan assembly, which is disposed in the second cover and acquires an image of the second document transported by the transporting mechanism past the second scan assembly, wherein:
a horizontal surface intersecting the first scan assembly also intersects the second scan assembly.

21. The multi-purpose peripheral according to claim 20, further comprising a third scan assembly, which is disposed in the body and opposite the second scan assembly, wherein the second scan assembly and the third scan assembly commonly scan images on two sides of the second document.

* * * * *